United States Patent
Bobinski et al.

[15] 3,706,280
[45] Dec. 19, 1972

[54] NOVEL COMBUSTIBLE CARTRIDGE CASE AND PROCESS THEREFOR

[72] Inventors: Jack Bobinski, Mountain Lakes, N.J.; Jean P. Picard, Morristown, both of N.J.

[73] Assignee: The United States of America as represented by the Secretary of the Army

[22] Filed: Dec. 29, 1970

[21] Appl. No.: 102,540

[52] U.S. Cl. ............................. 102/43, 86/1, 142/2
[51] Int. Cl. .................................................. F42b 5/02
[58] Field of Search.......... 102/38, 43, DIG. 1; 142/2; 86/1

[56] References Cited

UNITED STATES PATENTS

| | | | |
|---|---|---|---|
| 3,264,993 | 8/1966 | De Fries et al. | 102/DIG. 1 |
| 3,102,833 | 9/1963 | Schulz | 149/2 |

Primary Examiner—Benjamin A. Borchelt
Assistant Examiner—H. J. Tudor
Attorney—Harry M. Saragovitz, Edward J. Kelly and Herbert Berl

[57] ABSTRACT

Novel combustible cartridge cases of superior properties are obtained by impregnating a dry felted preform, produced from a mixture consisting essentially of a fibrous cellulosic material containing free hydroxyl groups and a highly combustible organic nitro compound in finely divided form, with an organic polyisocyanate or other water insoluble resin precursor capable of reacting with the cellulosic hydroxyl groups, and thereafter forming the water-insoluble resin in situ.

16 Claims, No Drawings

NOVEL COMBUSTIBLE CARTRIDGE CASE AND PROCESS THEREFOR

The invention described herein may be manufactured, used and licensed by or for the Government for governmental purposes without the payment to us of any royalties thereon.

The present invention relates to novel felted combustible cartridge casing material and to a method for making the same. More particularly, the invention relates to novel felted combustible cartridge cases of excellent tensile strength, water resistance and combustibility.

In the past felted, combustible cartridge cases have been made from mixtures of cellulose pulp and a highly combustible organic nitro compound such as nitrocellulose and pentaerythritol tetranitrate, by the felting technique, wherein an aqueous slurry of such mixture is felted on a mandrel or other suitable former into a porous form such as a cartridge case. The felting technique for manufacturing non-metallic cartridge cases is simple and practical, especially when cellulose pulp is employed. However, due to the presence of the hygroscopic cellulosic fibrous material, such cases on exposure to moisture readily absorb water with consequent loss of strength, dimensional stability and combustibility. To overcome this deficiency the case has been coated with moisture resistant materials, e.g., lacquers, waxes, etc. However, if the coating became damaged in handling or penetrated by moisture by prolonged exposure to water, the cellulose component absorbed sufficient moisture to render the case weak and useless. It has also been proposed to incorporate a water-insoluble resin, for example, by impregnating the felted case material with a solvent solution of a suitable resin, e.g., an acrylic or polyvinyl resin, and thereafter heating the material to cure the resin. A particularly suitable resin for this purpose, as noted in U.S. Pat. No. 3,474,702, is a polyvinyl-formal resin known as Formvar 7/95S. Although felted cartridge cases of this type, as previously produced by impregnation with a water-soluble resin, possess good tensile strength and improved resistance to moisture, they leave something to be desired.

An object of the present invention is to provide a novel process for producing a combustible cartridge case comprising felted fibrous cellulosic material characterized by high strength and resistance to moisture.

Another object is to provide a novel process for producing combustible cartridge case comprising felted fibrous cellulosic material and particulate pentaerythritol tetranitrate.

A further object is to provide a novel process for producing a combustible cartridge case comprising felted cellulose and nitrocellulose fibers.

An additional object is to provide combustible felted cartridge cases of said types which meet the requirements of military field use as to strength, water-resistance and combustibility, including excellent dimensional stability and resistance to impact and abrasion during handling and storage even after exposure to moisture.

Other objects and advantages of the invention will appear or be obvious from the description of the invention set forth below.

According to the present invention a novel combustible cartridge case material of high strength, water resistance and rigidity is produced by impregnating a dried, felted product consisting essentially of (a) fibrous cellulosic material containing free hydroxyl groups and (b) a highly combustible organic nitro compound in finely divided form, with a solution of a water insoluble resin precursor capable of reacting with the cellulosic hydroxyl groups, and thereafter forming the resin in situ.

An exceptionally effective class of resin precursors for use in the invention includes organic polyisocyanates, which term includes prepolymers containing free NCO groups, e.g., obtained by reacting one mole of a glycol with 2 moles of an organic diisocyanate. Advantageously, the organic polyisocyanate or prepolymer containing free NCO groups is employed in mixture with an organic polyol, the proportions being such as to provide a substantial excess of isocyanate groups over total hydroxyl groups in the polyol, viz, an NCO/OH ratio of at least about 1.5 to 1 and preferably at least 2 to 1. Thus, isocyanate groups are available to react with the cellulosic hydroxyl groups to form stable urethane linkages, thereby cross-linking the polymeric cellulose chains as well as the cellulose with the urethane polymer produced from the polyisocyanate and polyol. Further, by thus eliminating cellulosic hydroxyl groups, which are mainly responsible for the hygroscopic properties of cellulosic compounds, the hygroscopic properties of the final product are effectively reduced.

In this manner by forming a polyurethane resin binder in the felted product a cartridge case of outstanding strength and moisture resistance is obtained while retaining the porous structure of the case material required for complete combustion thereof. A valuable feature of the invention is that the isocyanate resin precursor and polyurethane resin formed are fully compatible with the highly combustible organic nitro compound of the case, e.g., PETN and nitrocellulose.

Suitable organic polyisocyanates include toluene-2,4-diisocyanate, toluene-2,6-diisocyanate, diphenylmethane-4,4'-diisocyanate, diphenyl-4,4'diisocyanate, polymethylenepolyphenylisocyanates produced by phosgenating polyamines containing more than two primary amino groups obtained by condensation of aniline with formaldehyde, naphthalene-1,5-diisocyanate, dicylohexylmethane-4,4'-diisocyanate, and prepolymers containing terminal NCO groups such as can be obtained by reaction of one mole of a glycol with 2 moles of an organic diisocyanate.

As previously noted, the organic polyisocyanates may be utilized advantageously with organic polyols in the process of the present invention, whereby they react with each other to form a polyurethane resin, as is well known. However, by employing a considerable excess of polyisocyanate over the polyol, as noted above, free isocyanate groups are available to react and cross link with the cellulose chains and the polyurethane resin. Suitable polyols include glycols, such as ethylene glycol, diethylene glycol, polyethylene- and polypropylene glycols, alcohols containing three or more hydroxyl groups, such as glycerol, 1,2,6-hexanetriol, pentaerythritol and mannitol, polyetherpolyols obtained by reaction of an alcohol or phenol having 2 or more hydroxyl groups with ethylene or propylene oxide, and polyester polyols obtained by reaction of a polycarboxylic acid or anhydride with an alcohol containing two or more hydroxyl groups.

To accelerate the reaction between the polyisocyanate and hydroxyl groups of the polyol and/or cellulosic components, the reaction is carried out in the present of a catalyst, as is well known, e.g., an organic tertiary amine such as triethylamine, triethylene diamine and N-methylmorpholine, or an organo-metallic compound or salt, e.g., stannous octoate, dibutyltindilaurate and phenyl mercuric acetate. Use of a catalyst permits formation and curing of the resin in the cartridge case at temperatures well below the melting or decomposition temperature of nitrocellulose, PETN, etc. thereby providing a completely safe operation.

To facilitate thorough impregnation of the dried felted cellulosic material by the resin precursor, the latter along with the catalyst and polyol are dissolved in a suitable inert organic solvent which can be readily removed by evaporation, e.g., methylene chloride, ethylacetate, and ethylene dichloride. The solvent should not dissolve the components of the felted preform to avoid adversely affecting the shape and porosity of the cartridge case. Impregnation can be accomplished, for example, by immersing or dipping the dried felted cellulosic material in resin precursor solution one or more times, with removal of solvent between dips, until the desired amount of precursor has been absorbed.

In addition to organic polyisocyanates other resin precursors capable of reacting with cellulosic hydroxyl groups and forming a water insoluble resin can be employed. For example, the felted preform can be impregnated with an epoxy resin precursor comprising a mixture of a polyglycidyl ether with a hardener containing an excess of the polyglycidyl ether over that required to react with the hardener. On heating the product to form and cure the resin, the glycidyl ether reacts with the hardener to form a cross-linked epoxy resin polymer as well as with the cellulosic hydroxyl groups to cross-link the cellulosic chains. Suitable polyglycidyl ethers include products obtained by reaction of epichlorohydrin with a polyhydric phenol, e.g., 4,4'-dihydroxydiphenylmethane, resorcinol, novolac resins etc. Suitable hardeners include dicarboxylic acids and anhydrides, e.g., phthalic-, succinic-, tetrahydrophthalic- and hexahydrophthalic anhydrides, and diamines such as m-phenylene-diamine, ethylene diamine, etc. Suitable catalysts for the reaction include tertiary amines, such as dimethylbenzylamine, triethylamine and 2,4-dimethylpyridine.

The felted material to be impregnated with the resin precursor may be made according to conventional felting techniques by filtering an aqueous slurry consisting essentially of a mixture of (a) fibrous cellulosic material containing free hydroxyl groups and (b) a highly combustible organic nitro compound in finely divided form, on a former, such as a mandrel, to provide a preform having the shape of a cartridge case, and drying the product. Advantageously a binder is added to the aqueous fiber slurry to assist in bonding the fibers so that when the wet fibrous mass is filtered and dried, a stronger preform better suited for the treatment with the resin precursor is obtained. A preferred binder is obtained by adding sodium carboxymethyl cellulose and a water soluble basic polyamide such as Kymene (Hercules Powder Co.), which interact to form a more or less water-insoluble complex which combines with the cellulosic fibrous material. With cellulose fibers the use of small amounts of binder is advantageous though not necessary; however, when a less readily feltable material like nitrocellulose is employed as the fibrous cellulosic material, relatively large amounts of binder are required, e.g., 20–25 Percent or more based on the weight of the preform, depending on the relative proportions of nitrocellulose fibers to explosive nitro compound present.

The fibrous cellulosic material may be cellulose fibers, such as Kraft pulp, or other fibrous cellulose derivatives capable of being felted and containing free hydroxyl groups, e.g., nitrocellulose and organic esters or ethers of cellulose such as cellulose acetate, cellulose nitrate acetate mixed ester, cellulose butyrate or mixtures thereof. Suitable highly combustible organic nitro compounds include nitrocellulose, pentaerythritol tetranitrate, (PETN), cyclotetramethylenetetranitramine (HMX) and cyclotrimethylene-trinitramine (RDX).

Cartridge cases hitherto obtained by the felting technique from cellulose fibers, e.g., Kraft pulp, mixed with substantial amounts of finely divided PETN and impregnated with a water-insoluble resin binder have possessed relatively poor strength and water resistance. However, by means of this invention it is possible to obtain cartridge cases, which fully meet military requirements of strength, water resistance and combustibility, from a dried felted preform consisting essentially of cellulose fibers and up to about 70 percent by weight of PETN.

By using nitrocellulose fibers in place of Kraft fibers in mixture with PETN it is possible to obtain cartridge cases of extremely low degree of water absorption, which are strong and fully combustible even after prolonged submersion in water. Since nitrocellulose fibers, e.g., military grade of 12.6 percent or less nitrogen content, are less strongly feltable than cellulose fibers, e.g., Kraft pulp, it is not possible, or necessary for combustibility of the final product, to incorporate as large amounts of PETN to produce a dried preform of suitable strength and porosity for treatment with the resin precursor solution. A preform containing from about 10 percent to about 50 percent by weight of PETN and the remainder consisting essentially of nitrocellulose fibers is satisfactory.

The amount of resin precursor employed may be varied widely. Generally an amount is used which is sufficient to provide from about 10 to about 50 percent, preferably about 20 to 30 percent, by weight of cured resin in the final product, as determined by the weight increase of the dry felted preform due to the formation of the resin. In general, the strength and water-resistance of the cartridge case increases to a maximum as said resin content is increased; further amounts of resin then become uneconomical and may adversely affect the combustibility of the cartridge case.

The following examples illustrate the invention. Unless otherwise noted, the parts are by weight and the degrees are in centigrade.

EXAMPLE 1

Part A. Preparation of a Felted Preform from Cellulose and Nitrocellulose Fibers 1.6 parts of Kraft pulp (Forest Products Lts., Crofton, British Columbia) were slurried in 500 parts of water in a Waring blender after which 11 parts nitrocellulose fibers (military grade containing 12.6 percent nitrogen) and 1.6 parts of sodium carboxymethyl cellulose (hereinafter referred to briefly as CMC) dissolved in 1,200 parts of water were stirred in. The resulting mixture was agitated for 10 minutes and 16 parts by volume of a 10 percent aqueous solution of a polyamide known as "Kymene" marketed by Hercules Powder Co. were introduced slowly with agitation. The fibrous slurry was then filtered on a standard Tappi hand sheet former and the sheet was first air-dried and then dried in a steam oven.

Part B. Treatment of the Preform with Resin Precursor

The dried felted sheet obtained in Part A above (15 parts) was immersed in a solution obtained by dissolving 10 parts polymethylene polyphenylisocyanate, NCO content 31.5 percent, marketed as PAPI by the Upjohn Co.
1 part of diethylene glycol
about 0.2 parts of stannous octoate catalyst
in 50 parts of methylene chloride.

The saturated sheet thus obtained was placed in a container protected from atmospheric moisture by a tube packed with calcium chloride and a stream of dry nitrogen was passed through the container to evaporate the solvent. The sheet was then heated to 70° in an oven for 3 days to cure the resin.

The product thus obtained contained 31.4 percent by weight of urethane resin and possessed the following properties:

| | |
|---|---|
| tensile strength | 3,250 psi. |
| elongation | 3.6% |
| water absorption | 4.2% by wt. after immersion in 17 hours at room temperature) |
| combustibility | fully combustible leaving no residue when |
| (product tested in form of a sleeve) | fired in an erosion apparatus with a conventional military propellant at 32,000 psi. |

In comparison, products obtained by bonding a similar felted product of cellulose and nitrocellulose fibers with a polyvinyl formal resin (Formvar) as in the prior art, absorbed water and could not be fired if exposed to moisture.

EXAMPLE 2

Casing Material Containing Kraft Fibers and PETN

Part A

To an agitated aqueous slurry prepared from 18.6 parts of Kraft pulp, 1,000 parts of water, 1.6 parts of CMC and 16 parts of 10 percent aqueous Kymene was added an aqueous dispersion of
25 parts of powdered PETN
1.6 parts of CMC
1.6 parts 10% aqueous Kymene solution
1000 parts of water.

The combined mixture was agitated for 10 minutes and filtered on the Tappi hand sheet former. The resulting sheet was air dried for 2 days and then dried in a steam oven for 1 day.

Part B.

The dried sheet obtained above was immersed in a solution of
20 parts of PAPI, NCO content 31.5%
2.0 part of diethylene glycol
0.4 part of stannous octoate catalyst
in 40 parts of methylene chloride.

The mass was then treated essentially as described in Example 1B to evaporate the solvent and cure the resin.

The product thus obtained contained about 31 percent by weight of polyurethane resin and possessed the following properties:

| | |
|---|---|
| tensile strength | 4087 psi |
| elongation | 5.5% |
| porosity | 49% |

EXAMPLE 3

Casing Material Containing Kraft Fibers and PETN

Twenty parts of the dried, felted sheet prepared as described in Example 2, Part A was saturated by dipping it one or more times in a solution of
15 parts of polymethylene polyphenyl isocyanate NCO content 31.5 percent (PAPI)
0.1 parts of stannous octoate
in 30 parts of methylene chloride.

The mass was treated as described above to evaporate the solvent and then heated in an oven at 80° for 3 days to react the isocyanate groups.

Several samples, differing only in the amount of organic isocyanate absorbed and reacted in the felted product, were prepared in the foregoing manner.

The following table sets forth the properties of the products thus obtained. A control sample (5) similarly prepared but omitting organic isocyanate is also shown.

| Sample | 1 | 2 | 3 | 4 | 5 |
|---|---|---|---|---|---|
| Wt. % resin (reacted isocyanate) | 33 | 33 | 34 | 41 | 0 |
| Porosity % | 52 | 52 | 54 | 54 | 72 |
| tensile strength psi | 3546 | 3546 | 3465 | 3535 | 1059 |
| Elongation % | 3.5 | 3.7 | 3.3 | 2.8 | 3.7 |
| Moisture absorption 95–100 RH at 24°C-% wt. | 6.2 | 5.4 | 6.2 | 5.3 | |

EXAMPLE 4

Combustible Casing Material Containing Kraft Fibers and PETN

Part A.

A dispersion of
35 parts granular PETN
1.5 parts CMC
15 parts 10% aqueous Kymene
1000 parts water
was stirred into a slurry of
9.4 parts Kraft pulp
1.5 parts CMC 15 parts 10 percent aqueous Kymene solution.
The resulting mixture was agitated for 10 minutes in a Waring blender and filtered on the Tappi hand sheet former. The sheet thus obtained was dried as above.

Part B

Fifty parts of the dried material obtained in Part A were immersed in a solution of
   31 parts PAPI, NCO content 31.5%
   3.1 parts diethylene glycol
   0.7 part stannous octoate
   60 parts methylene chloride.

The resulting mass was treated essentially as in Example 1B to remove the solvent and cure the resin.

The product thus obtained contained about 40 percent by weight of the polyurethane resin and possessed the following properties:

| | |
|---|---|
| tensile strength | 4223 psi |
| elongation | 2.5% |
| water absorption | 6.1% (after immersion in water for 17 hours at room temperature) |
| combustibility | completely combustible, left no residue when fired with a conventional propellant at |
| (Product tested in form of a sleeve) | 16000 psi. |

EXAMPLE 5

Combustible Casing Material Containing Nitrocellulose Fibers and PETN

Part A

Eleven parts of military grade nitrocellulose (12.6 percent nitrogen, degree of substitution of 2.5, leaving 0.5 hydroxyl group per anhydroglucose unit available for reaction with the organic isocyanate) and 4.6 parts of PETN were added to a solution of 3.2 parts of CMC in 1200 parts of water with continuous agitation until a homogeneous mixture was obtained. Thirty-two parts of 10 percent aqueous solution of Kymene were then slowly stirred in. The resulting mixture was filtered on the Tappi hand sheet former and the fibrous sheet thus obtained was air dried.

Part B

The dried sheet obtained above was immersed in a solution of:
   20 parts of polymethylene polyphenyl isocyanate, NCO content 31.5%.
   2 parts of diethylene glycol
   0.2 part of stannous octoate
   in 40 parts of methylene chloride.

A small amount of solution was not absorbed. The saturated sheet was treated essentially as described above to evaporate the solvent and cure the resin.

The product thus obtained contained 43.9 percent by weight of the polyurethane resin and possessed the following properties:
   tensile strength—3358 psi
   elongation—2.9%
   porosity—31.7%
   water absorption after 1 hour immersion in water — 1.2%
   water absorption after 17 hours immersion in water — 5.3%
   combustibility — fully combustible (no residue) when fired with
   (product tested conventional propellant at 16,000 psi.
   in form of a sleeve)

EXAMPLE 6

The dried sheet produced as described in Example 4, Part A was immersed in a solution of:
   20.0 parts of an isocyanate terminated polyester of 6.5% by weight NCO content, marketed by Mobay Chemical Co. as F-242.
   2.0 parts of diethylene glycol
   0.2 part of stannous octoate
   40.0 parts of methylene chloride The resulting mass was treated to evaporate the solvent and partially cure the resin. Thereafter the product was immersed in a solution of
   10 parts of polymethylene polyphenyl isocyanate, NC. content 31.5%
   1.0 part of diethylene glycol
   0.1 part of stannous octoate
   20 parts of methylene chloride
after which the mass was treated in the foregoing manner to evaporate the solvent and cure the resin.

The product thus obtained contained about 40 percent by weight of total polyurethane resin and possessed the following properties:
   tensile strength—4336 psi
   elongation—2.5%
   water absorption after immersion in water for 17 hours—5.5%
   combustibility (product tested in form of a sleeve)— fully combustible (no residue) when fired with conventional propellant at 32,000 psi. (even after case was submerged in water for 3 days, removed, wiped and fired within 1 ½ hours thereafter).

The novel combustible cartridge cases of the invention, if desired, can be subjected to known treatments for improving water-resistance, etc. Thus, the case may be coated with a lacquer of a water-insoluble resin, e.g., nitrocellulose or a melamine formaldehyde resin, by spraying or brushing as is well known.

We wish it to be understood that we do not desire to be limited to the exact detail of construction shown and described for obvious modification will occur to a person skilled in the art.

What is claimed is:

1. A method for making a combustible cartridge case of high strength and water resistance, which comprises impregnating a dried, felted preform consisting essentially of
   a. a fibrous cellulosic material containing free hydroxyl groups and
   b. a finely divided, highly combustible organic nitro compound, with a solution of an organic polyisocyanate in a volatilizable, inert organic solvent, removing said organic solvent by evaporation, and heating the impregnated preform to react said organic polyisocyanate with the hydroxyl groups of said cellulosic material and produce a water insoluble resin.

2. A mixture according to claim 1 wherein the water-insoluble resin formed amounts to from about 10 percent to about 50 percent by weight of the cartridge case.

3. A method according to claim 1 wherein the organic polyisocyanate is a polymethylene polyphenylisocyanate.

4. A method according to claim 1 wherein the organic polyisocyanate is employed in mixture with an organic polyol, the ratio of NCO groups to polyol hydroxyl groups being greater than about 1.5 to 1.

5. A method according to claim 1 wherein the fibrous cellulosic material is cellulose and the highly combustible organic nitro compound is nitrocellulose, the amount of nitro cellulose being at least equal to the weight of said cellulose.

6. A method according to claim 1 wherein the dried felted preform contains from about 10 percent to about 50 percent of pentaerythritol tetranitrate and the remainder consists essentially of nitrocellulose fibers.

7. A method according to claim 1 wherein the dried felted preform contains from about 50 percent to about 70 percent of pentaerythritol tetranitrate and the remainder consists essentially of cellulose fibers.

8. The product obtained by the method of claim 1.
9. The product obtained by the method of claim 2.
10. The product obtained by the method of claim 3.
11. The product obtained by the method of claim 4.
12. The product obtained by the method of claim 5.
13. The product obtained by the method of claim 6.
14. The product obtained by the method of claim 9.
15. A method according to claim 4, wherein the organic polyol is diethylene glycol.
16. The product obtained by the method of claim 15.

* * * * *